United States Patent [19]

Legille et al.

[11] Patent Number: 4,575,790

[45] Date of Patent: Mar. 11, 1986

[54] METHOD AND APPARATUS FOR CONTROLLING THE MOVEMENT OF AN OSCILLATING SPOUT

[75] Inventors: Edouard Legille, Luxembourg; Guy Thillen, Diekirch; Emile Lonardi, Bascharage, all of Luxembourg

[73] Assignee: Paul Wurth S.A., Luxembourg, Luxembourg

[21] Appl. No.: 515,697

[22] Filed: Jul. 21, 1983

[30] Foreign Application Priority Data

Jul. 28, 1982 [LU] Luxembourg .......................... 84303

[51] Int. Cl.[4] ...................... G05B 15/00; B65G 25/00; B65G 1/00; B65G 11/00

[52] U.S. Cl. .................................... 364/130; 364/479; 414/160; 414/208; 414/299; 193/16

[58] Field of Search ............... 364/130, 148, 153, 154, 364/155, 479; 414/160, 161, 167, 199, 206, 208, 299; 193/16, 17, 18, 19, 20, 21; 222/55; 266/176, 183

[56] References Cited

U.S. PATENT DOCUMENTS

| | | | |
|---|---|---|---|
| 3,362,585 | 1/1968 | Nessim et al. | 222/55 |
| 3,581,070 | 5/1971 | Tsujihata et al. | 364/148 X |
| 3,929,240 | 12/1975 | Legille et al. | 414/206 X |
| 4,042,130 | 8/1977 | Legille et al. | 414/199 |
| 4,243,351 | 1/1981 | Legille et al. | 414/206 |
| 4,493,600 | 1/1985 | Legille et al. | 414/206 X |
| 4,525,120 | 6/1985 | Legille et al. | 414/160 |
| 4,526,536 | 7/1985 | Legille et al. | 414/206 X |

FOREIGN PATENT DOCUMENTS

| | | | |
|---|---|---|---|
| 7707178 | 1/1979 | Netherlands | 414/161 |
| 782486 | 3/1956 | United Kingdom | 266/21 |

OTHER PUBLICATIONS

*Steel in the USSR*, Bocka, pp. 176–178.
"Peripheral Distribution of Materials in Throat Using Rotating Chute", Zherebin et al., pp. 609–610.
*Iron and Steel Engineer*, Powell, pp. 86–90.
European Search Report for Application No. 83106698.

*Primary Examiner*—Jerry Smith
*Assistant Examiner*—Jon D. Grossman
*Attorney, Agent, or Firm*—Fishman & Dionne

[57] ABSTRACT

A method and apparatus for controlling the movement of an oscillating spout is presented wherein uneven distribution of spout discharge material is eliminated or at least substantially reduced by a compensating action of varying the angular speed of rotation of the spout in accordance with the angular position of the spout. The present invention is particularly suited for use in conjunction with a charging installation of a shaft furnace, particularly those charging devices having a spout with a cardan suspension system.

14 Claims, 5 Drawing Figures

FIG. 1
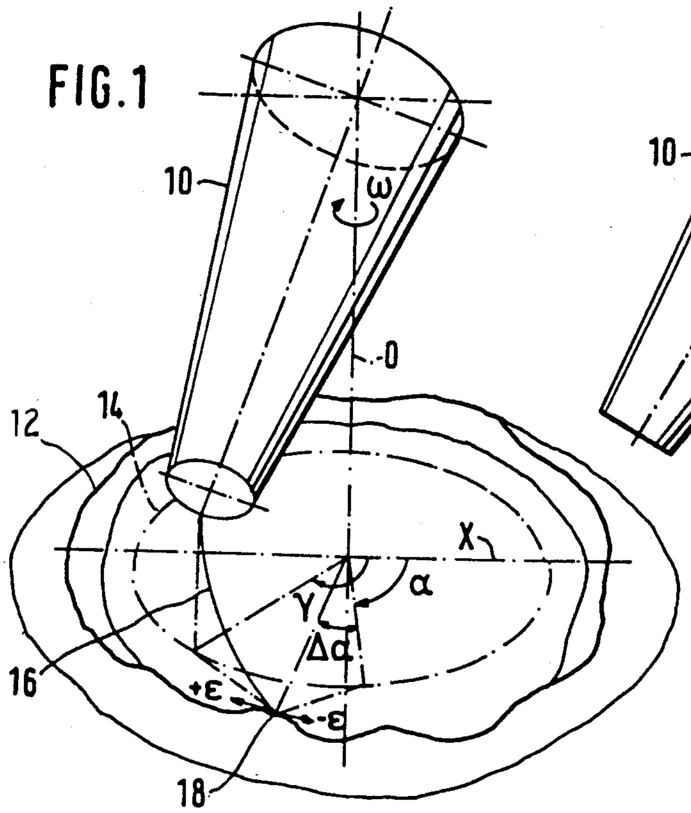
FIG. 2
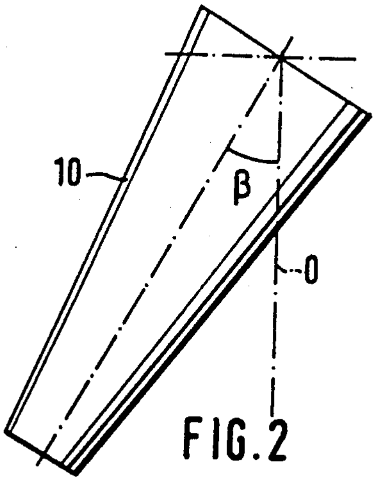
FIG. 3
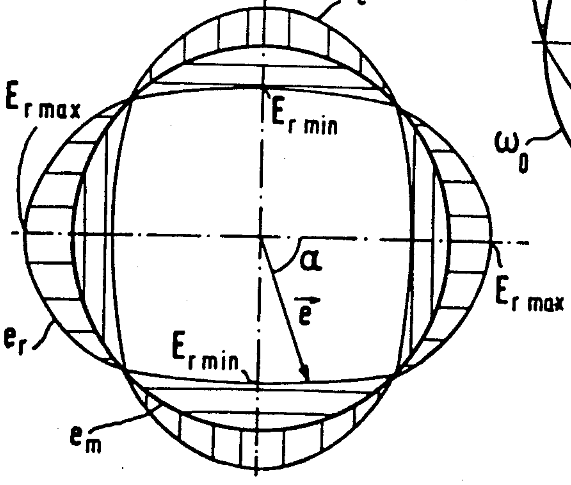
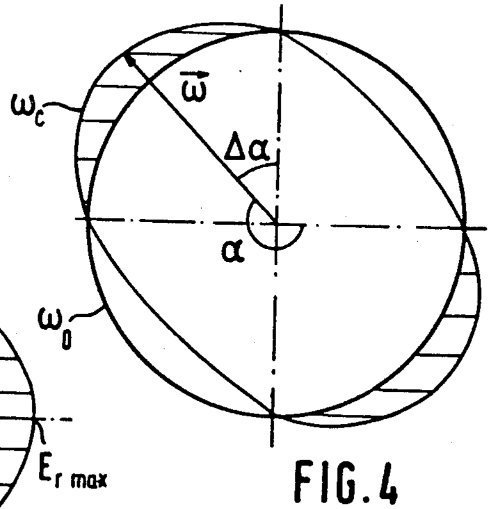
FIG. 4

METHOD AND APPARATUS FOR CONTROLLING THE MOVEMENT OF AN OSCILLATING SPOUT

BACKGROUND OF THE INVENTION

This invention relates to the field of oscillating spouts. More particularly, this invention relates to an apparatus and process for controlling the movement of an oscillating spout capable of pivoting about two orthogonal axes, the spout being actuated by two independent driving means in order to move the end of the spout over concentric circles or over a spiral course around a vertical axis.

The method and apparatus of the present invention are well suited for use in conjunction with a charging installation of a shaft furnace. A shaft furnace charging apparatus employing an oscillating distributing spout is disclosed in Luxembourg Patent Application No. 83,280 corresponding to U.S. patent application Ser. Nos. 288,974 and 675,301, now U.S. Pat. Nos. 4,525,120 and 4,547,116, respectively, which are both assigned to the assignee herein and is of the general type to which the present invention is directed. That charging apparatus is generally known in the art as a spout with a cardan-type suspension.

Experiments on a conventional charging device of the type hereinabove described reveal that the layers of material deposited by means of an oscillating spout within the shaft furnace are of uneven thickness. Obviously, if only a single layer of material was utilized, these irregularities in thickness would have no especially damaging effects upon the charging of a shaft furnace. Unfortunately, these irregularities are repeated at the same points for each layer deposited. These points of irregular distribution correspond to certain angular positions of the spout. Thus, the respective uneven layers exhibit a cumulative effect which result in a saddle-shaped charging level. It has also been found that this defect is not peculiar to the apparatus disclosed in the aformentioned Luxembourg patent application; rather, it occurs to a greater or lesser extent in all charging apparatus having a spout suspension system of the cardan-type, regardless of the particular driving and control means used.

The uneven charging thickness occurs because cardan-type distributing spouts undergo slight but nevertheless perceptible pivoting movements about their longitudinal axis at certain diametrically opposed points in the course of each revolution. When this pivoting movement starts, there is a reduction in friction effects between the charge material and the spout and also within the charge material, as the charge passes through the spout. Thus, the speed of fall of the material increases. In other words, the onset of the pivoting movement causes the material to reach its fall or impact point more quickly; and the thickness of the deposited layer increases in the places where the fall or impact point occurs corresponding to the angular position which the spout occupies when the pivoting movement takes place. Similarly, the opposite effect is produced at the end of the pivoting movement of the spout, i.e., the friction effects within the spout once again increases, thus leading to a reduction in the thickness of the layer deposited at the corresponding fall or impact point of the material.

SUMMARY OF THE INVENTION

The above discussed and other problems of the prior art are overcome or alleviated by the apparatus and method of the present invention. In accordance with the present invention, a novel process and apparatus for controlling the movement of an oscillating spout are provided wherein the uneven distribution discussed above is eliminated or at least substantially reduced by a compensating action.

The compensating action of the present invention is accomplished by an apparatus and method of novel control of the spout movement characterized by a modification of the angular rotational speed of the spout about the vertical axis according to the angular position which the spout occupies.

The angular positions of the spout at which the pivoting movement occurs which leads to the uneven charge deposits can be determined by experiment or by calculation for a given spout. In accordance with the process of the present invention, once these angular positions are known, the angular rotational speed of the distributing spout is increased in the places where the thickness of the deposited layer tends to increase and reduced where the thickness of the deposited layer tends to decrease.

In a preferred embodiment of the present invention, the angular speed of the spout is controlled according to the formula $$\omega_1=(\omega_0/e_m)f(\alpha+\Delta\alpha)$$

An improved eveness of the deposit thickness may be achieved by adopting the following procedure by progressive iterations $$\omega_2=(\omega_1/e_m)f(\alpha+\Delta\alpha)$$

In the foregoing formulas:

$\omega_1$ $\omega_2$ represents the corrected angular speeds, $\omega_0$ represents the uncorrected angular speed and $e_m$ represents a function of the angular position.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures:

FIG. 1 is a schematic representation of a distributing spout during the operation of depositing a layer of material in a ring shaped configuration.

FIG. 2 is a schematic representation of the spout of FIG. 1 showing the inclination of the spout with respect to the central axis.

FIG. 3 is a polar coordinate diagram showing the thickness of layers of material deposited by means of an oscillating spout of FIG. 1 without and with the compensation of the present invention.

FIG. 4 is a polar coordinate diagram showing the annular speed of a spout of FIG. 1 without and with the compensation of the present invention.

DESCRIPTION OF THE PREFERRED EMBODIMENT

Figure 5:
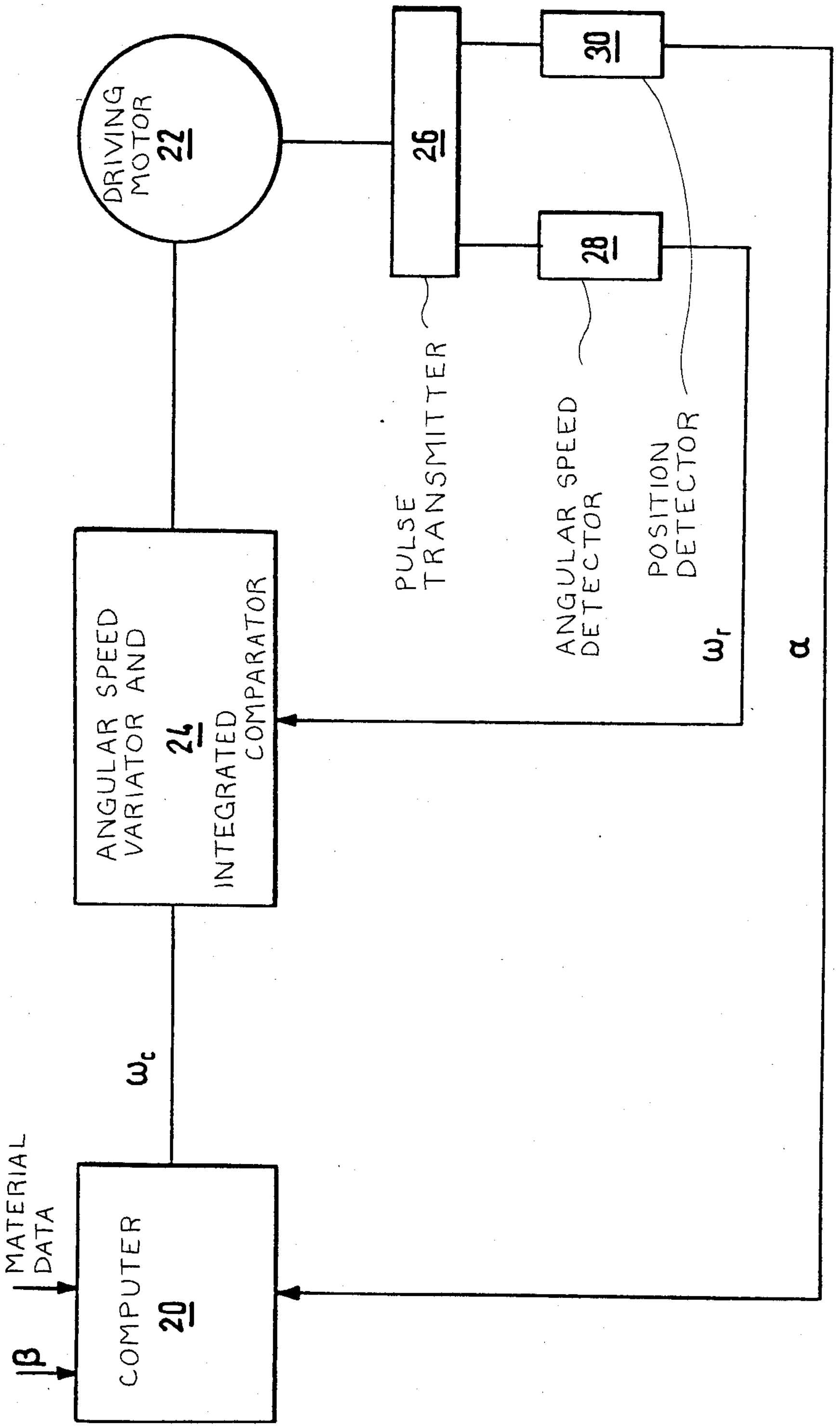
FIG. 5 is a block diagram of a control circuit in accordance with the process of the present invention.

Referring first to FIGS. 1 and 2 wherein an oscillating distributing spout 10 is shown in a particular angular position in which the spout 10 is inclined at an angle $\beta$ (see FIG. 2) in relation to a vertical axis O and at an angle $\gamma$ (FIG. 1) in relation to a horizontal reference axis, e.g., the axis x. If the spout 10 is inclined at an angle $\beta$, and performs a gyratory movement in a clockwise direction around the axis O at an angular speed $\omega$ to deposit material on the burden in a ring-shaped configuration, the speed of rotation will be:

$$\omega = d\alpha/dt$$

When spout 10 rotates about axis O at an angle of inclination $\beta$ thereto, the spout will deposit material in an annular track or ring 12. The reference number 14 indicates the horizontal projection of the circular trajectory of the lower end of the spout 10.

The material discharged by the spout has a falling trajectory 16 which has a vertical component and an angular component as a result of $\omega$. In other words, the charging material does not fall or impact on the point at which the spout is aimed at the exact moment when the material leaves the spout. This is illustrated in FIG. 1.

Assuming that a particle leaves the spout when the latter occupies the angular position $\alpha$ and that the spout continues its gyratory movement at the speed $\omega$ in a clockwise direction, the impact of this particle occurs when the spout occupies an angular position $\gamma$. Thus, the point of impact 18 of this same particle will be found somewhere between the two positions $\alpha$ and $\gamma$, e.g., in the position $\alpha+\Delta\alpha$. In other words, there is an angular difference $\Delta\alpha$ between the moment when a particle emerges from the spout and the moment of its impact on the burden of the furnace. The amount of this angular difference $\Delta\alpha$ is a function not only of the geometry of the material, but also of the speed at which it falls.

Depending on the speed of fall (i.e., if the speed of fall should change), the particle will reach the burden at either an earlier or later time and the point at which the material impacts will be found either in front of or behind the position $\Delta\alpha$. A change in the speed of fall occurs in all oscillating distributing spouts with a cardan-type suspension, which, as stated earlier, perform two pivoting movements about their longitudinal axis on each revolution. This pivoting movement results in a variation in the friction between the charging material and the wall of the spout as the pivoting occurs. This modification of the friction accelerates or decelerates the speed of descent of the particles depending on the momentary stage of the motion. That is, as pivoting starts, the friction effects are reduced and speed of fall increases; as pivoting stops, the friction effects increase and speed of fall decreases.

When pivoting of the spout and acceleration of the speed of fall takes place, the angular difference of the point of impact decreases, for example, to $\Delta\alpha-\epsilon$, and this tends to thicken the deposit of material at the point $\Delta\alpha-\epsilon$ from that angular position of the spout at which this pivoting movement occurred. Similarly, when pivoting ends and deceleration of the speed of fall takes place, the angular difference of the point of impact becomes $\Delta\alpha+\epsilon$, whereby the thickness of the layer of deposited material decreases. This deceleration occurs at the end of the pivoting phase, and the reduction in thickness is therefore found at an angular distance of $\Delta\alpha+\epsilon$ from the angular position at which the spout performs its pivoting movement.

Referring now to FIG. 3, the thickness of an annular layer of material discharged onto the burden is shown in polar coordinates. In FIG. 3 the material thickness is proportional to the radial distance from the point of intersection of the two axes. The curve $e_m$ represents the optimum average thickness calculable, for example, according to the contents of a storage tank and the surface area of the associated burden. Since the optimum average thickness is uniform, the curve $e_m$ will be a circle. The curve represented by $e_r$ is the real thickness of a layer of material deposited by an oscillating spout performing a gyratory movement at a constant angular speed $\omega_0$ and affected by the irregularities from the pivoting motion previously discussed. The thickness of the deposited layer for each angular position $\alpha$ is represented by the length of the vector $\vec{e}$. The curve $e_r$, the contour of which has been deliberately exaggerated, shows the existence of two positions of maximum thickness at the points $E_{r\text{-}max}$ to be found in the angular positions 0° and 180°, and also two positions of minimum thickness at the points $E_{r\text{-}min}$ to be found in the angular positions 90° and 270°.

FIG. 4 is a polar diagram similar to FIG. 3 but indicating the angular speeds $\omega$. Thus, $\omega_0$ is the constant angular speed of spout 10 which results in depositing the uneven layer $e_r$ shown in FIG. 3.

The curve $\omega_c$ is a curve showing the compensated speeds of the spout required to deposit an even layer; and the curve $\omega_c$ is obtained by the modification of the curve $\omega_0$ according to the formula:

$$\omega_c(\alpha) = (\omega_0/e_m)f(\alpha+\Delta\alpha) = \omega_1(\alpha)$$

The angular speed for each angular position is represented by the vector length $\vec{\omega}$.

In the above formula:

$\omega_1 = \omega_c$ = modified or compensated angular speed.

$\omega_0$ = non-modified angular speed, which produces $e_r$.

f = a function of $\alpha$ and of $\Delta\alpha$, i.e., of the parameters governing the modification of the angular speed. The function f is defined by $f(\alpha) = e_r(\alpha)$ = thickness measured before compensation.

The angular speed is compensated to ensure that the phenomena due to the pivoting of the spout and those due to the variation of the angular speed will balance each other out resulting in a uniform layer deposited on the burden.

The curve $e_c$ of FIG. 3 corresponds to the curve $\omega_c$ of FIG. 4. That is, the curve $e_c$ shows the thickness of the layer deposited when the angular speed is modified according to the foregoing formula for $\omega_c$. The curve $e_c$ is at some angular distance $\Delta\alpha$ away from the curve $\omega_c$ to take into account the time required for the fall of the material.

Compensation of the angular speed according to FIG. 4 modifies the layer $e_r$ and produces a curve e which is or approaches the ideal circular curve $e_m$. Thus, if the spout 10 is caused to rotate about its axis O faster at the angular positions corresponding to increases in the thickness of the deposited layer according to the curve $e_r$ and rotate more slowly at those positions corresponding to reduction in the thicknesses of the deposited layer according to the curve $e_r$, then the irregularities in the thickness of the deposited layer will be eliminated or reduced.

The compensation formula can be presented and derived mathematically as follows:

Let $e_r(\alpha)$ be the thickness of the layer for $\omega_0$=constant, thus resulting in the thickness irregularities due to pivoting.

Let $e_v(\alpha)$ be the thickness of the layer for $\omega_c$=variable, disregarding the irregularities due to pivoting.

$$e_v(\alpha) = e_m \frac{\omega_o}{\omega_c(\alpha - \Delta\alpha)}$$

The average theoretical thickness, e, resulting from the superimposition of the two speeds is then as follows:

$$e = \sqrt{e_v(\alpha)\, e_r(\alpha)}$$

$$= \sqrt{e_m \frac{\omega o}{\frac{\omega o}{e_m} e_r(\alpha - \Delta\alpha + \Delta\alpha)} e_r(\alpha)}$$

$$= \sqrt{e_m\, e_m}$$

$$= e_m$$

In other words, the compensated thickness is close to the ideal uniform thickness $e_m$.

If a first compensation, carried out by regulating the angular speed, does not suffice to produce the desired result (i.e., uniform thickness), then a progressive iteration method can be adopted and a finer compensation effected in accordance with the formula:

$$\omega_2 = \omega_1 / e_m f(\alpha + \Delta\alpha)$$

and so forth.

The compensation speeds $\omega_1$, $\omega_2$, etc. are determined either by tests or by calculation, as the parameters determine those speeds can be either measured or calculated. Since $\alpha$ is a function of $\beta$ and of the granulometry of the charging material, the compensated angular speeds $\omega_1$, $\omega_2$, . . . , may be determined for different angles of inclination $\beta$ and for different material granulations.

The different determined values for the compensated angular speed can be stored in a micro-computer capable of calculating, by means of linear interpolations, the exact compensated angular speed of the spout at any given moment. FIG. 5 is a block diagram of one version of a control circuit for the compensation of the angular speed of the spout. The micro-computer 20 receives information concerning the angle of inclination and the properties of the charging material for the compensated angular speed calculations. A driving motor 22, which represents the two independent driving means for the spout 10 receives the control signals from an angular speed variator 24 comprising, inter alia, an integrated comparator. Speed variator 24 is connected to driving motor 22 to vary the speed of one or both driving means (represented by the single block 22) depending on the requirements at any instant. The mechanical part of a pulse transmitter 26 is connected to drive motor 22. An angular speed detector 28 and a position detector 30 for detecting actual speed and position of spout 10, respectively, are connected to pulse transmitter 16. These two detectors 28 and 30 can be combined, since $\omega = d\alpha/dt$.

The angular speed detector 28 generates signals corresponding to the actual angular speed $\omega_r$ at each moment and conveys these signals to the speed variator 24. Similarly, the position detector 30 generates signals corresponding to the actual angular position $\alpha$ of the distributing spout 10 at each moment and conveys that information to the micro-computer 20. At each moment and as a result of the formulae presented above, the micro-computer 20 calculates the required compensated angular speed $\omega_c$ on the basis of the information received, i.e., $\alpha$, $\beta$ and the parameters corresponding to the nature (e.g., granulometry) of the material with which the furnace is charged. Signals corresponding to the compensated angular speed $\omega_c$ calculated by the micro-computer 20 are transmitted to the angular speed variator 24. The integrated comparator of the variator 24 continuously compares the required compensated angular speed $\omega_c$ with the real angular speed $\omega_r$ (which it received the information from the detector 28). The driving motor 22 is then accelerated or decelerated according to the result of the comparison of $\omega_c$ and $\omega_r$.

The procedure of the present invention for correcting the angular speed of the spout is particularly suitable for a driving device of the type proposed in the Luxembourg Patent Application Ser. No. 83,280 mentioned previously, because the gyratory movement of the oscillating spout of that Luxembourg Patent Application established by a driving device performing a circular movement. It should, however, be noted that the correction device of the present invention is equally suitable for use in conjunction with other driving devices for an oscillating spout with a cardanic suspension system, such as that driven by a pair of hydraulic jacks.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for controlling movement of an oscillating material delivery spout capable of pivoting about two orthogonal axes in order to move an end of the spout over a predetermined course about a vertical axis, including the steps of:

imparting rotational movement to said spout about said vertical axis by first and second independent driving means; and controlling angular rotational speed of said spout about said vertical axis in accordance with angular position of the spout to deposit a charge of material from said spout in a predetermined manner, said charge material comprising particles which fall from said spout and impact at a point; and wherein said step of controlling said rotational speed of the spout is effected to obtain a compensated speed $\omega_1$ in accordance with the formula:

$$\omega_1 = (\omega_0 / e_m) f(\alpha + \Delta\alpha)$$

where:

$\omega_1$ is the compensated angular speed of the spout;

$\omega_0$ is the non-compensated angular speed of the spout;

f is a function of $\alpha$ and of $\Delta\alpha$ where $\alpha$ is the angular position of the spout at the start of fall of a particle of material from the spout and $\Delta\alpha$ is the angular difference between $\alpha$ and the point of impact of the material at the end of its fall; and $e_m$ is the optimum average thickness of the material.

2. The process of claim 1 including the steps of:

storing the compensated angular speeds in a micro-computer;

linearly extrapolating between the stored values to effect an exact value of the angular speed.

3. The process of claim 1 wherein:

the values of the compensated angular speed are effected by progressive iterations in accordance with the formula:

$$\omega_2=(\omega_1/e_m)f(\alpha+\Delta\alpha)$$

where:

$\omega_2$ is a second compensated angular speed of the spout;

$\omega_1$ is a first compensated angular speed of the spout;

f is a function of $\alpha$ and of $\Delta\alpha$ where $\alpha$ is the angular position of the spout at the start of fall of a particle of material from the spout and $\Delta\alpha$ is the angular difference between $\alpha$ and the point of impact of the material at the end of its fall; and $e_m$ is the optimum average thickness of the material.

4. The process of claim 3 including the steps of:

storing the compensated angular speeds in a micro-computer;

linearly extrapolating between the stored values to effect an exact value of the angular speed.

5. A process for controlling movement of an oscillating material delivery spout capable of pivoting about two orthogonal axes in order to move end of the spout over a predetermined course about a vertical axis, the spout being driven by first and second independent driving means, including the steps of:

imparting rotational movement to said spout about said vertical axis by said first and second independent driving means; and controlling angular rotational speed of said spout to obtain a compensated angular speed $W_1$ about said vertical axis in accordance with angular position of the spout to deposit a charge of material from said spout in a predetermined manner; and wherein the step of controlling rotational speed of the spout includes:

varying the operating speed of at least one of said first and second driving means.

6. The process of claim 5 including the steps of:

storing the compensated angular speeds in a micro-computer;

linearly extrapolating between the stored values to effect an exact value of the angular speed.

7. The process of claim 5 wherein:

the values of the compensated angular speed are effected by progressive iterations in accordance with the formula:

$$\omega_2=(\omega_1/e_m)f(\alpha+\Delta\alpha)$$

where:

$\omega_2$ is a second compensated angular speed of the spout;

$\omega_1$ is a first compensated angular speed of the spout;

f is a function of $\alpha$ and of $\Delta\alpha$ where $\alpha$ is the angular position of the spout at the start of fall of a particle of material from the spout and $\Delta\alpha$ is the angular difference between $\alpha$ and the point of impact of the material at the end of its fall; and $e_m$ is the optimum average thickness of the material.

8. The process of claim 7 including the steps of:

storing the compensated angular speeds in a micro-computer;

linearly extrapolating between the stored values to effect an exact value of the angular speed.

9. An apparatus for controlling movement of an oscillating material delivery spout capable of pivoting about two orthogonal axes in order to move an end of the spout over concentric circles or over a spiral course around a vertical axis comprising:

position detector means for monitoring angular position of said spout;

speed detector means for monitoring actual angular speed of said spout;

computer means connected to said position detector for integrating said angular position of said spout with data relating to material being delivered to said spout and data relating to said angular relationship of said spout to said vertical axis to define a compensated angular speed;

comparator means for continuously comparing said compensated angular speed from said computer means with said actual angular speed from said speed detector means to generate signals which regulate said angular speed of said spout; and speed variator means connected to said computer means and connected to said speed detector means, said variator containing said comparator means.

10. The control apparatus of claim 9 including:

driving motor means which is accelerated or decelerated according to the comparison by said comparator means.

11. The control apparatus of claim 9 wherein said computer means is micro-computer means.

12. An apparatus for controlling movement of an oscillating material delivery spout capable of pivoting about two orthogonal axes in order to move an end of the spout over concentric circles or over a spiral course around a vertical axis comprising:

position detector means for monitoring angular position of said spout;

speed detector means for monitoring actual angular speed of said spout;

computer means connected to said position detector for integrating said angular position of said spout with data relating to material being delivered to said spout and data relating to said angular relationship of said spout to said vertical axis to define a compensated angular speed;

comparator means for continuously comparing said compensated angular speed from said computer means with said actual angular speed from said speed detector means to generate signals which regulate said angular speed to said spout; and pulse transmitter means connecting said driving motor means to said position detector means and said speed detector means.

13. The control apparatus of claim 12 including:

driving motor means which is accelerated or decelerated according to the comparison by said comparator means.

14. The control apparatus of claim 12 wherein said computer means is micro-computer means.

* * * * *